(12) United States Patent
Boulware et al.

(10) Patent No.: US 9,095,788 B2
(45) Date of Patent: Aug. 4, 2015

(54) MICROWAVE-ENHANCED PROCESS AND SYSTEM TO TREAT FRAC WATER

(76) Inventors: Ryan Boulware, Conroe, TX (US); Alan Springer, The Woodlands, TX (US); Scott Jensen, Kingwood, TX (US)

(*) Notice: Subject to any disclaimer, the term of this patent is extended or adjusted under 35 U.S.C. 154(b) by 421 days.

(21) Appl. No.: 13/531,473

(22) Filed: Jun. 22, 2012

(65) Prior Publication Data

US 2013/0015144 A1    Jan. 17, 2013

Related U.S. Application Data

(63) Continuation-in-part of application No. 11/489,919, filed on Jul. 20, 2006.

(60) Provisional application No. 61/577,334, filed on Dec. 19, 2011, provisional application No. 60/701,273, filed on Jul. 21, 2005.

(51) Int. Cl.
| | | |
|---|---|---|
| *B01F 3/08* | (2006.01) | |
| *B01F 3/04* | (2006.01) | |
| *B01F 3/12* | (2006.01) | |
| *C08G 61/04* | (2006.01) | |
| *C08F 2/46* | (2006.01) | |
| *C08F 2/50* | (2006.01) | |
| *B01D 17/04* | (2006.01) | |
| *B01D 17/02* | (2006.01) | |
| *C02F 1/30* | (2006.01) | |
| *C02F 1/32* | (2006.01) | |
| *C02F 1/40* | (2006.01) | |
| *C02F 1/02* | (2006.01) | |
| *C02F 101/32* | (2006.01) | |

(52) U.S. Cl.
CPC .......... *B01D 17/042* (2013.01); *B01D 17/0217* (2013.01); *B01D 17/048* (2013.01); *C02F 1/302* (2013.01); *C02F 1/32* (2013.01); *C02F 1/02* (2013.01); *C02F 1/40* (2013.01); *C02F 2101/32* (2013.01)

(58) Field of Classification Search
CPC .. B01D 17/0217; B01D 17/042; B01D 17/06; B01D 17/048; C02F 1/32; C02F 1/302; C02F 1/40; C02F 1/02; C02F 2010/32
USPC ............. 516/53, 9, 10, 20, 21, 31, 32, 38, 77, 516/901, 905; 520/1; 523/171, 1; 524/457, 524/1; 514/772; 507/90; 430/113, 112, 105, 430/104, 97, 31; 210/748.07; 250/432
See application file for complete search history.

(56) References Cited

U.S. PATENT DOCUMENTS

| | | | |
|---|---|---|---|
| 5,439,595 A * | 8/1995 | Downey, Jr. ............. | 210/748.07 |
| 5,514,820 A | 5/1996 | Assmann et al. | |
| 5,578,090 A | 11/1996 | Bradin | |
| 5,911,885 A | 6/1999 | Owens | |
| 5,914,014 A | 6/1999 | Kartchner | |
| 6,077,400 A | 6/2000 | Kartchner | |
| 6,086,830 A | 7/2000 | Kartchner | |
| 6,174,501 B1 | 1/2001 | Noureddini | |
| 7,332,094 B2 | 2/2008 | Abney et al. | |
| 8,764,978 B2 | 7/2014 | Foret | |
| 2004/0167233 A1 | 8/2004 | Varadaraj | |
| 2006/0162245 A1 | 7/2006 | Porter et al. | |
| 2010/0320155 A1 | 12/2010 | Enos et al. | |
| 2013/0023448 A1 * | 1/2013 | Glasscott et al. ............. | 507/100 |

FOREIGN PATENT DOCUMENTS

| | | | |
|---|---|---|---|
| CN | 101254987 | * | 9/2008 |
| CN | 102145952 A | | 8/2011 |
| WO | 2013012757 A1 | | 1/2013 |

OTHER PUBLICATIONS

Yuan et al, CN 101254987 Machine Translation, Sep. 3, 2008.*
Kinver, M., "Microwaves 'cook ballast aliens'", BBC News, [retrieved from the Internet on Sep. 7, 2011 using <URL:http://newsvote.bbc.co.uk/mpapps/pagetools/print/news.bbc.co.uk/2/hi/science/nature/7392072.stm>].
Mazzocchia et al., "Fatty Acid Methyl Esters Synthesis from Triglycerides Over Heterogeneous Catalysts in Presence of Microwaves," Comptes Rendus Chimie, 7 (6-7), pp. 601-605m (2004).
Mazzocchia et al., "Biodiesel and FAME from Triglycerides Over Acid and Basic Catalysts Assisted by Microwave," Dipartimento di Chimica, Materiali ed Ingegneria Chimica, Politecnico di Milano, Piazza Leonardo da Vinci 32-20133, Milano, Italy.

* cited by examiner

*Primary Examiner* — Ling Choi
*Assistant Examiner* — Jessica E Whiteley
(74) *Attorney, Agent, or Firm* — Fraser Clemens Martin & Miller LLC; William J. Clemens

(57) ABSTRACT

Described is an improved method and system for remediating Frac water and other emulsions created during hydraulic fracturing. The system can include a first collection unit adapted to store contaminated Frac water, at least one pumping unit adapted to pump a portion of the contaminated Frac water, and a second collection unit for storing remediated Frac water. The system can further include a microwave separation technology ("MST") unit, an ultra-violet light remediation ("UVLR") unit, and a chemical additive unit adapted to reduce contamination levels of the contaminated Frac water. The MST unit can work alone, or in combination with the UVLR unit, the chemical additive unit, or both, to further reduce contamination levels of the contaminated Frac water. The system can be deployed at an onsite drilling facility or at a centralized offsite location. By reusing remediated Frac water, entities can realize significant cost savings and better environmental compliance.

19 Claims, 3 Drawing Sheets

MICROWAVE-ENHANCED PROCESS AND SYSTEM TO TREAT FRAC WATER

CROSS REFERENCE TO RELATED APPLICATIONS

This application claims the benefit of priority to U.S. Provisional Application No. 61/577,334 filed on Dec. 19, 2011, and is a continuation-in-part of U.S. Non-Provisional Application No. 11/489,919 filed Jul. 20, 2006, which claims the benefit of priority to U.S. Provisional Application No. 60/701,273 filed Jul. 21, 2005, the foregoing applications incorporated herein by reference in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

As a modern trend, oil and gas producers have turned to a process known as Hydraulic Fracturing, of "fracing," in order better develop tight-gas reservoirs in deep rock formations. The fracing process is used pervasively throughout the industry (for example, the Barnett Shale, Marcellus Formation, and Eagle Ford Formation areas in North America) because it is an efficient and economically beneficial process of extracting oil and gas from deep rock formations. During the fracing process, oil and gas producers employ the use of a fracturing fluid, such as water, oil, or acid, in order to improve oil and gas production through wellbore drilling in reservoir rock formations. The fracturing fluid can be used to fracture rock layers and release oil and natural gas stored within the multiple layers of rock. To increase its effectiveness, fracturing fluid often comprises a propping agent used to hold open cracks in rock formations after hydraulic pressure dissipates. By holding open these cracks for an extended period of time, producers can realize increased natural resource yields during the fracing process.

The fracing process is typically carried out by injecting large volumes of highly-pressurized fresh water into a well in order to induce structural cracks known as fractures. Prior to injection, the water is generally treated with a friction reducer, biocides, scale inhibitors, or surfactants. The injected water often contains a propping agent, such as sand, to hold open the fractures formed by the injected water to maximize the extraction of the natural resources. Once the fracing process is complete, the fracturing fluid is returned to the surface along with both the natural salt water found in the oil and gas reservoir, and the extracted oil and gas targeted by the fracing process. This combined fluid is often referred to as fracture return water or "Frac water."

Frac water can be susceptible to contamination by virtue of its exposure to bacteria and other pathogens during the fracing process. Accordingly, the Frac water returning to the surface can be potentially dangerous to the environment if it is not recovered and disposed of properly. Moreover, these bacterial and pathogenic contaminates can prohibit a well producer from reusing the Frac water after the initial fracing. This resulting waste can add significant costs to the drilling operation. For example, horizontal well fracturing can use between an average of three to five million gallons of water each time the well is fractured. Without the ability to reuse the Frac water after the initial fracing, well producers must safely dispose of the contaminated Frac water and purchase additional non-contaminated Frac water for subsequent fracing of the well. These added costs can be quite significant considering that wells are often re-fractured multiple times over a period of several years.

It is therefore desirable to have a solution for properly recovering, treating, reusing, or disposing of Frac water in order to overcome the problems set forth above.

BRIEF SUMMARY OF THE INVENTION

Embodiments presented herein provide, among other things, an improved method and system for treating Frac water and other emulsion wastes comprising water and/or hydrocarbons. In particular, embodiments relate to the use of Microwave Separation Technology (MST) for treating Frac water at an onsite drill operation, dockside, or at remote, centralized location. Once treated, the Frac water can be reinserted into well drilling sites thus resulting in a significant reduction in the costs associated with the fracing process. Moreover, once treated, contaminates such as bacteria and pathogens can be greatly reduced, thus mitigating the environmental risks typically associated with Frac water storage, transportation, and disposal.

Described is an improved method and system for remediating Frac water and other emulsions created during hydraulic fracturing. The system can include a first collection unit adapted to store contaminated Frac water, at least one pumping unit adapted to pump a portion of the contaminated Frac water, and a second collection unit for storing remediated Frac water. The system can further include a microwave separation technology ("MST") unit, an ultra-violet light remediation ("UVLR") unit, and a chemical additive unit adapted to reduce contamination levels of the contaminated Frac water. The MST can work alone, or in combination with the UVLR unit, the chemical additive unit, or both, to further reduce contaminations levels of the contaminated Frac water. The system can be deployed at an onsite drilling facility or at a centralized offsite location. By reusing remediated Frac water, entities can realize significant cost savings and better environmental compliance.

The disclosure also provides a microwave-enhanced treatment method for Frac water remediation that can include storing contaminated Frac water and pumping a portion of the contaminated Frac water. The disclosure also provides subjecting the contaminated Frac water to a microwave separation technology ("MST") process to reduce contamination levels of the contaminated Frac water, and subjecting the contaminated Frac water to an ultra-violet light technology ("UVLR") process to further reduce contamination levels of the contaminated Frac water. The MST process step and UVLR process step can either alone, or in combination, facilitate the process of producing remediated Frac water.

The disclosure also provides a microwave-enhanced treatment method for Frac water remediation that can include subjecting the contaminated Frac water to a MST process to reduce contamination levels of the contaminated Frac water. The method can further include subjecting the contaminated Frac water to a UVLR process to further reduce contamination levels of the contaminated Frac water. The process can further include subjecting the contaminated Frac water to a chemical additive process. The method can further include storing remediated Frac water.

BRIEF DESCRIPTION OF THE SEVERAL VIEWS OF THE DRAWINGS

The following figures form part of the present specification and are included to further demonstrate certain aspects of the present invention. The invention can be better understood by reference to one or more of these figures in combination with the detailed description of specific embodiments presented herein.

DETAILED DESCRIPTION

Described is an improved method and system for remediating Frac water and other emulsions created during hydraulic fracturing. The system can include a first collection unit adapted to store contaminated Frac water, at least one pumping unit adapted to pump a portion of the contaminated Frac water, and a second collection unit for storing remediated Frac water. The system can further include a microwave separation technology ("MST") unit, an ultra-violet light remediation ("UVLR") unit, and a chemical additive unit adapted to reduce contamination levels of the contaminated Frac water. The MST can operate alone, or in combination with the UVLR unit, the chemical additive unit, or both, to further reduce contaminations levels of the contaminated Frac water. The system can be deployed at an onsite drilling facility or at a centralized offsite location. By reusing remediated Frac water, entities can realize significant cost savings and better environmental compliance.

Figure 1:
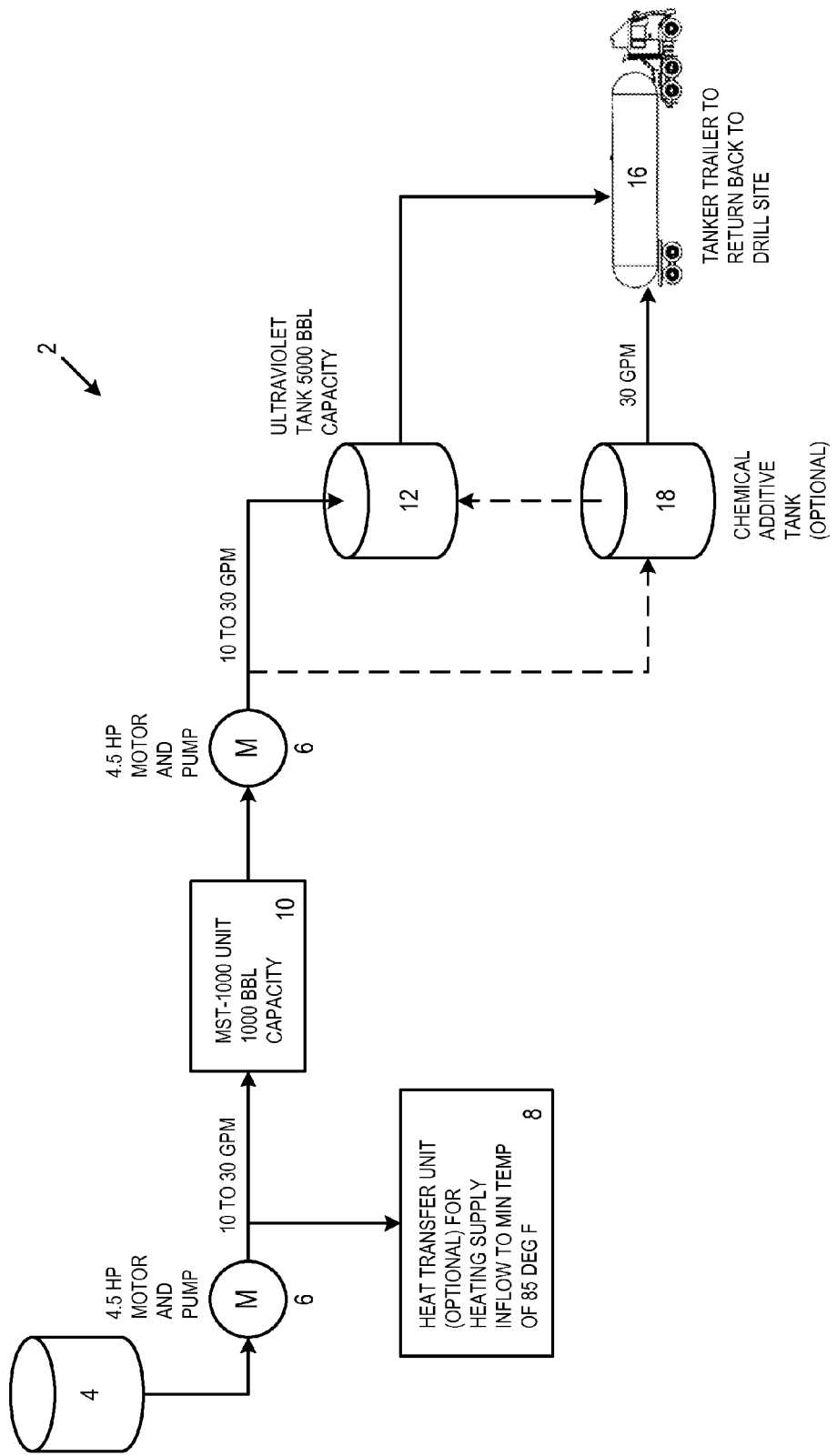
FIG. 1 is a first embodiment of the microwave-enhanced treatment system for Frac water remediation.

FIG. 1 is a first embodiment of the microwave-enhanced treatment ("MET") system for Frac water remediation. The MET system 2 can include a first collection unit 4 adapted to store contaminated Frac water. The MET system 2 can further include at least one pumping unit 6 adapted to pump at least a portion of the contaminated Frac water. The MET system 2 can further include a thermal unit 8 and a microwave separation treatment ("MST") unit 10. The MST unit 10 can be adapted to reduce contamination levels of the contaminated Frac water. The MET system 2 can further include an ultra-violet light remediation ("UVLR") unit 12. The UVLR unit 12 can be adapted to further reduce contamination levels of the contaminated Frac water to produce remediated Frac water. The MET system 2 can further include a fluid conduit 14 and a second collection unit 16. The second collection unit 16 can be adapted to store remediated Frac water. The MET system 2 can further include a chemical additive unit 18.

In an exemplary and non-limiting illustrative embodiment, the first collection unit 4 can include a high-capacity collection tank for collecting contaminated Frac water. In other embodiments, the first collection unit 4 can be any type of container of various shapes and sizes that can be adapted to store liquids, solids, or gases. For example, the first collection unit 4 can be a fixed container adapted to remain permanently on an offshore oil drilling facility.

In another embodiment, the first collection unit 4 can include a mobile container, such as a storage container coupled to a tanker truck. In another embodiment, the first collection unit 4 can serve merely as a conduit to transport Frac water to another part of the MET system 2. In another embodiment, the first collection unit 4 can store or transport fully contaminated Frac water, partially contaminated Frac water, or remediated Frac water. In one embodiment, the first collection unit 4 can include more than one container.

In an exemplary and non-limiting illustrative embodiment, the at least one pumping unit 6 can include a pump comprising a pump motor adapted to pump Frac water to or from other components of the MET system 2. In one embodiment, the at least one pumping unit 6 can include two pumps: one for pumping Frac water to the MST unit 10, and the other for pumping Frac water from the MST unit 10 to the second collection unit 16.

In another embodiment, the at least one pumping unit 6 can include more than two pumps for pumping Frac water to and from various components of the MET system 2. In one embodiment, the at least one pumping unit 6 can include any device for raising, driving, or compressing liquids, gases, or emulsions from one point of the MET system 2 to another. In one embodiment, the at least one pumping unit 6 can pump contaminated Frac water, partially contaminated Frac water, or remediated Frac water. In another embodiment, the at least one pumping unit 6 can include three pumping units: one pumping unit for pumping partially contaminated Frac water, a second for pumping contaminated Frac water, and a third for pumping remediated Frac water.

In one embodiment, the fluid conduit 14 can include one or more conduits adapted to transport fluids to one or more components of the MET system 2. Fluids can include any liquids, gases, emulsions, or any viscous substance. In an exemplary and non-limiting illustrative embodiment, the fluid conduit 14 can include a series of pipes or tubes coupled to one or more components of the MET system 2 to transport Frac water to and from one or more of these components.

In an exemplary and non-limiting illustrative embodiment, the fluid conduit 14 can include a series of pipes coupling the first collection unit 4 to at least one pumping unit 6 to a thermal unit 8. The fluid conduit 14 can further include one or more pipes to couple the at least one pumping unit 6 and the thermal unit 8 to the MST unit 10. The fluid conduit 14 can further include one or more pipes coupling the MST unit 10 to a second pumping unit. The fluid conduit 14 can further include one or more pipes coupling the second pumping unit to the UVLR unit 12. Finally, the fluid conduit 14 can include one or more pipes coupling the UVLR unit 12 to the second collection unit 16. In another embodiment the fluid conduit 14 can include one or more pipes coupling one or more components of the MET system 2 to a chemical additive unit 18.

In an exemplary and non-limiting illustrative embodiment, the thermal unit 8 can include a heat exchanger adapted to heat the Frac water. For example, the thermal unit 8 can be used to heat the Frac water to a minimum temperature of 85 degrees Celsius before the Frac water is received by the MST unit 10. In another embodiment, the thermal unit can be used to either heat the Frac water to a temperature above the ambient temperature of the MST system 2, but less than 85 degrees Celsius. In another embodiment, the thermal unit 8 can be used to cool the Frac water below the ambient temperature of the MST system 2. In one embodiment, the thermal unit 8 can be omitted from the MST system 2 altogether.

In one embodiment, the MST unit 10 can be adapted to employ microwave energy to facilitate the treatment of contaminated Frac water. The unique characteristics of microwave energy allow microwaves to facilitate certain physical and chemical reactions. More specifically, microwaves employ a unique establishment of rapidly oscillating electric and magnetic fields that selectively energize strongly polar and strongly charged molecules relative to non-polar and neutral, or less polar and less charged, molecules. Due to its versatility, microwave technology can be employed in a variety of applications to induce these physical and chemical reactions.

For example, U.S. patent application Ser. No. 11/489,919 describes a Microwave-Enhanced Process to Treat Marine Emulsion Wastes. U.S. Pat. Application No. 11/340,137 describes a Microwave-Enhanced Process to Maximize Biodiesel Production Capacity. Furthermore, U.S. Pat. No. 5,914,014, U.S. Pat. No. 6,077,400; and U.S. Pat. No. 6,086,830 each describe a Method for Processing Crude Oil and Water Emulsions using Microwave Energy. This technology, however, has not been applied to remediate contaminated Frac water.

As discussed in greater detail below, the straight-forward application of microwave energy to contaminated Frac water does not necessarily produce an optimized remediation system. However, contaminated Frac water can be successfully remediated by employing a MST unit 10 with optimized power settings alone or in combination with a UVLR unit 12 or a chemical additive unit 18, or both. More specifically, experimental results suggest that a MST unit 10 that emits microwaves at power ranges between approximately 20-60 kW can effectively reduce the contamination levels of contaminated Frac water. Table 1 below summarizes these findings:

In order to rectify these unexpected results, further experimentation revealed that Frac water contamination levels can be reduced to approximately zero by subjecting the Frac water to a UVLR unit 12 (employing a ultra-violet light technology process), a chemical additive unit 18 (employing a chemical additive process), or both, after subjecting the contaminated Frac water to the MST unit 10. In one embodiment, the MST unit's 10 effectiveness can be further improved by employing a thermal unit 8 to heat the Frac water to a temperature of 85 degrees Celsius or greater before subjecting the Frac water to the ultra-violet technology process.

In an exemplary and non-limiting illustrative embodiment, the UVLR unit 12 can be located in a collection unit that is of similar design to the first collection unit 4. For example, the UVLR unit 12 can comprise a modified version of the first collection unit 4 with additional structure for remediating contaminated Frac water or partially contaminated Frac water with ultra-violet light. In one embodiment, the UVLR unit 12 can be coupled to a collection unit of similar design to the first collection unit 4. In another embodiment, the UVLR unit 12 can comprise an ultra-violet light remediation structure adapted to remediate contaminated Frac water or partially contaminated Frac water without requiring a collection unit altogether.

In one embodiment, the UVLR unit 12 exposes the Frac water to ultra-violet light through an ultra-violet light technology process. For example, the UVLR unit 12 can expose Frac water to ultra-violet irradiation over a period of several seconds. Alternatively, the UVLR unit 12 can expose Frac water to ultra-violet irradiation over a period of several days. In one embodiment, the wavelength of the light emitted from the UVLR unit 12 can vary within the range of approximately 90 nm to 400 nm. In one exemplary and non-limiting illustrative embodiment, the MST unit 8, employing the MST process, can first eliminate approximately 95% of the contaminates of contaminated Frac water. Once the contaminates

TABLE 1

| Test | Power | Analyte | Result | RL | Units | DF | Analylzed | Method |
|---|---|---|---|---|---|---|---|---|
| BOD[1] | 0 kW | BOD[1], 5 day | 1670 | 1000 | mg/l | 1 | Jul. 27, 2011 | SM 5210B |
| BOD[1] | 20 kW | BOD[1], 5 day | 1340 | 500 | mg/l | 1 | Jul. 27, 2011 | SM 5210B |
| BOD[1] | 30 kW | BOD[1], 5 day | 736 | 600 | mg/l | 1 | Jul. 27, 2011 | SM 5210B |
| COD[2] | 0 kW | COD[2] | 3380 | 250 | mg/l | 5 | Aug. 2, 2011 | SM 5220D |
| COD[2] | 20 kW | COD[2] | 2230 | 250 | mg/l | 5 | Aug. 2, 2011 | SM 5220D |
| COD[2] | 30 kW | COD[2] | 1290 | 100 | mg/l | 2 | Aug. 2, 2011 | SM 5220D |

[1]Bacteria Oxygen Depletion
[2]Chemical Oxygen Demand

More specifically, recent empirical evidence suggests that the MST unit's 10 effectiveness can be vastly improved with the aid of a UVLR unit 12 (employing an ultra-violet technology process), a chemical additive unit 18 (employing a chemical additive process), or both. For example, the result of a particular experiment indicated that the MST unit 10 can be effective to initially eliminate approximately 95% of the contamination levels of contaminated Frac water. However, further experiments suggested that the Frac water's contamination levels will increase, quite unexpectedly, to approximately 50% of its original concentrations after several days of storage at approximately 25 degrees Celsius.

are reduced, the UVLR unit 12, employing the ultra-violet technology process discussed above, can eliminate most or all of the remaining approximately 5% contaminates remaining in the Frac water.

In one embodiment, the chemical additive unit 18 exposes the Frac water to one or more chemicals through a chemical additive process. In one exemplary and non-limiting illustrative embodiment, the MST unit 8, employing the MST process, can first eliminate approximately 95% of the contaminates of contaminated Frac water. Once the contaminates are reduced, the chemical additive unit 18, employing the chemical additive process discussed above, can eliminate most or all of the approximately 5% contaminates remaining in the Frac water. In one embodiment, the chemical additive unit 18 can be used as an alternative to the UVLR unit 12. In another embodiment, the chemical additive unit 18 can be used to supplement the UVLR unit 12.

In an exemplary and non-limiting illustrative embodiment, the second collection unit 16 can include a high-capacity collection tank for collecting remediated Frac water. In other embodiments, the second collection unit 16 can be any type of container of various shapes and sizes that can be adapted to store liquids, solids, or gases. For example, the second collection unit 16 can be a fixed container adapted to remain permanently on an offshore oil drilling facility.

In another embodiment, the second collection unit 16 can include a mobile container, such as a storage container coupled to a tanker truck. In another embodiment, the second collection unit 16 can serve merely as a conduit to transport Frac water for disposal or reuse in a fracing process. In another embodiment, the second collection unit 16 can store or transport contaminated Frac water, partially contaminated Frac water, or remediated Frac water. In one embodiment, the second collection unit 16 can include more than one container.

In one embodiment, the MET system 2 can be implemented on an onsite drilling facility. For example, the onsite drilling facility can include an offshore drilling facility. Alternatively, the onsite drilling facility can include a drilling site located on land. In another embodiment, the MET system 2 can be implemented at a centralized offsite location. For example, the centralized offsite location can include a location that is remote with respect to the drilling site. In another embodiment, the MET system 2 can be implemented across more than one locations. For example, the MET system 2 can be decentralized and spread across various locations either onsite or offsite with respect to the drilling facility.

The term "contaminated Frac water" can mean Frac water that contains one or more contaminates. A contaminate can include, but is not limited to, any pathogen, bacteria, virus, microorganism, microbe, or other infectious agent. More specifically, the term "pathogen," as used herein, can refer to any undesirable foreign or infectious agents, including but not limited to microbes, viruses, bacteria, fungi, prions, mycoplasma, and the like), particularly those fluid contaminants that can preclude using the fluid in future applications. Example pathogens include viruses such as variola major (smallpox), Ebola, HIV, hepatitis viruses, influenza viruses, papillomaviruses, herpesviruses, and adenoviruses; bacteria such as *Mycobacterium* species, *Salmonella* species, *Yersinia* species, *Chlamydia* species, *Coxella burnetti, Francisella tularensis, Brucella* species, *Bordetella* species, *Listeria monocytogenes*, and *legionella pneumophila*; fungi, such as *Histoplasma capsulatum*; and protozoa such as *Plasmodium* species, *Trypanosoma* species, *Leishmania* species, and *Toxoplasma gondii*; yeasts, such as species and strains of *Saccharomyces* species, *Blastomyces* species, or *Schizosaccharomyces* species; molds, such as those of the genera *Cladosporium* sp., *Alternaria* sp., *Penicillium* sp., *Histoplasma* sp., *Cryptococcus* sp., and *Aspergillus* sp.; nanobacterium; prions; proteins, especially infectious proteins; multicellular parasites; nucleic acids; metabolic by-products of a pathogen; cellular by-products of a pathogen; or a toxin. The term pathogen as used herein also includes those parts of the pathogen that are sufficient for their detection by typical pathogenic detection means.

The term "remediated Frac water" can mean Frac water that contains fewer contaminates than "contaminated Frac water." The term "remediated Frac water" can also mean Frac water that contains contaminates in a lesser concentration than "contaminated Frac water." The term "partially contaminated Frac water" can mean Frac water that contains more contaminates than "remediated Frac water," but fewer contaminates than "contaminated Frac water." The term "partially contaminated Frac water" can also mean Frac water that contains contaminates in a greater concentration than "remediated Frac water," but in a lesser concentration than contaminated Frac water.

In an exemplary and non-limiting illustrative embodiment, remediated Frac water can include Frac water that contains approximately 5% of the contaminates originally present in the contaminated Frac water. In another embodiment, remediated Frac water can include Frac water that contains 0% of contaminates originally present in the contaminated Frac water. In another embodiment, remediated Frac water can include Frac water that contains more than approximately 5% of the contaminates originally present in the contaminated Frac water. In another exemplary and non-limiting illustrative embodiment, the terms "partially contaminated Frac water" and "contaminated Frac water" can be used interchangeably.

Figure 2:
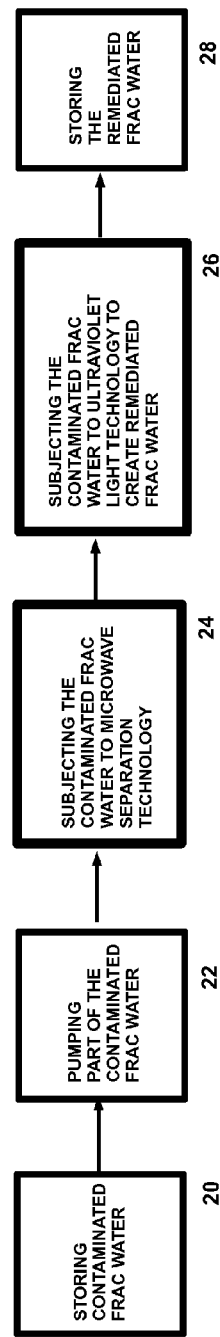
FIG. 2 is a flow diagram depicting a microwave-enhanced treatment method for Frac water remediation.

FIG. 2 is a flow diagram depicting a microwave-enhanced treatment ("MET") method for Frac water remediation. The MET method can include the step 20 of storing contaminated Frac water. The MET method can further include the step 22 of pumping a portion of the contaminated Frac water. The MET method can further include the step 24 of subjecting the contaminated Frac water to a microwave separation technology ("MST") process to reduce contamination levels of the contaminated Frac water. The MET method can further include the step 26 of subjecting the contaminated Frac water to an ultra-violet light technology ("UVLR") process to further reduce contamination levels of the contaminated Frac water. The MET method can further include the step 28 of storing the remediated Frac water.

Figure 3:
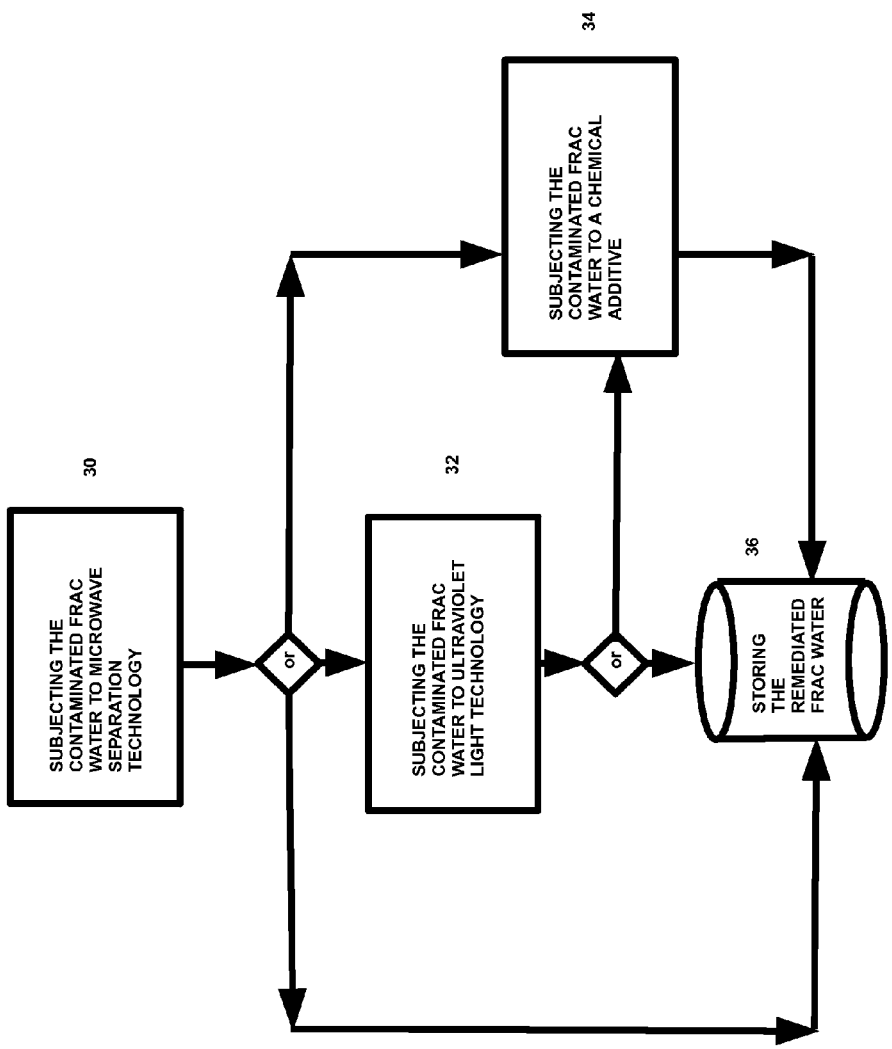
FIG. 3 is a flow diagram depicting another microwave-enhanced treatment method for Frac water remediation.

FIG. 3 is a flow diagram depicting another microwave-enhanced treatment ("MET") method for Frac water remediation. The MET method can include the step 30 of subjecting the contaminated Frac water to a microwave separation technology ("MST") process. The MET method can further include the step 32 of subjecting the contaminated Frac water to an ultra-violet light technology "(UVLT") process. The MET method can further include the step 34 of subjecting the contaminated Frac water to a chemical additive process. The MET method can further include the step 36 of storing the remediated Frac water.

In an exemplary and non-limiting illustrative embodiment, the MET method can include the step 30 of subjecting the contaminated Frac water to a MST process and the step 36 of storing the remediated Frac water, while omitting the remaining steps of the method disclosed in FIG. 3. In another exemplary and non-limiting illustrative embodiment, the MET method can include the step 30 of subjecting the contaminated Frac water to a MST process, the step 34 of subjecting the contaminated Frac water to a chemical additive process, and the step 36 of storing the remediated Frac water, while omitting the step 32 of subjecting the contaminated Frac water to an UVLT process.

In another exemplary and non-limiting illustrative embodiment, the MET method can include the step 30 of subjecting the contaminated Frac water to a MST process, the step 32 of subjecting the contaminated Frac water to an UVLT process, and the step 36 of storing the remediated Frac water, while omitting the step 34 of subjecting the contaminated Frac water to a chemical additive process. In another exemplary and non-limiting illustrative embodiment, the MET method can include the step 30 of subjecting the contaminated Frac water to a MST process, while omitting the remaining steps of the MET method disclosed in FIG. 3.

The term "coupled," "coupling," "coupler," and like terms are used broadly herein and can include any method or device for securing, binding, bonding, fastening, attaching, joining, inserting therein, forming thereon or therein, or otherwise associating, for example, mechanically, magnetically, electrically, chemically, operably, directly or indirectly with intermediate elements, one or more pieces of members together and can further include without limitation integrally forming one functional member with another in a unitary fashion. The coupling can occur in any direction, including rotationally.

The Figures described above and the written description of specific structures and functions above are not presented to limit the scope of what Applicant has invented or the scope of the appended claims. Rather, the Figures and written description are provided to teach any person skilled in the art to make and use the invention for which patent protection is sought. Those skilled in the art will appreciate that not all features of a commercial embodiment of the invention is described or shown for the sake of clarity and understanding. Persons of skill in this art will also appreciate that the development of an actual commercial embodiment incorporating aspects of the present invention will require numerous implementation-specific decisions to achieve the developer's ultimate goal for the commercial embodiment. Such implementation-specific decisions can include, and likely are not limited to, compliance with system-related, business-related, government-related and other constraints, which can vary by specific implementation, location and from time to time. While a developer's efforts might be complex and time-consuming in an absolute sense, such efforts would be, nevertheless, a routine undertaking for those of skill this art having benefit of this disclosure. It must be understood that the invention disclosed and taught herein is susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Likewise, discussion of singular elements or components can include plural elements or components, and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

In some alternate implementations, the functions/actions/structures noted in the Figures can occur out of the order noted in the block diagrams and/or operational illustrations. For example, two operations shown as occurring in succession, in fact, can be executed substantially concurrently or the operations can be executed in the reverse order, depending upon the functionality/acts/structure involved. Furthermore, although FIG. 3 illustrates one possible embodiment of a microwave-enhanced treatment method for Frac water remediation. For example, FIG. 3 recites the step 34 of subjecting the contaminated Frac water to a chemical additive process before the step 32 of subjecting the contaminated Frac water to an ultra-violet light technology process. Other embodiments can include performing step 32 before step 34. In some embodiments, some steps can be omitted altogether. Therefore, though not explicitly illustrated in the Figures, any and all combinations or sub-combinations of the steps illustrated in FIG. 3, or additional steps described in the Figures or the detailed described provided herein, can be performed in any order, with or without regard for performing the other recited steps.

Those of skill in the art should, in light of the present disclosure, appreciate that many changes can be made in the specific embodiments which are disclosed and still obtain a like or similar result without departing from the scope of the invention.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A microwave-enhanced treatment system for Frac water remediation, comprising:
   a first collection unit adapted to store contaminated Frac water;
   at least one pumping unit adapted to pump at least a portion of the contaminated Frac water from the first collection unit;
   a microwave separation technology unit connected to receive the at least a portion of the contaminated Frac water from the at least one pumping unit and having a storage capacity for storing the at least a portion of the contaminated Frac water, wherein the microwave separation technology unit is adapted to reduce contamination levels of the at least a portion of the contaminated Frac water;
   an ultra-violet light remediation unit connected to receive the at least a portion of the contaminated Frac water from the microwave separation technology unit and having a storage capacity for storing the at least a portion of the contaminated Frac water, wherein the ultra-violet light remediation unit is adapted to further reduce the contamination levels of the at least a portion of the contaminated Frac water to produce remediated Frac water;
   another pumping unit connected between the microwave separation technology unit and the ultra-violet light remediation unit for pumping the at least a portion of the contaminated Frac water; and
   a second collection unit connected to the ultra-violet light remediation unit and adapted to store the remediated Frac water.

2. A microwave-enhanced treatment system for remediation of an emulsion containing water and contaminates, comprising:
   a first collection unit adapted to store the contaminated emulsion;
   at least one pumping unit adapted to pump at least a portion of the contaminated emulsion from the first collection unit;
   a microwave separation technology unit connected to receive the at least a portion of the contaminated emulsion from the at least one pumping unit and having a storage capacity for storing the at least a portion of the contaminated emulsion, wherein the microwave separation technology unit is adapted to reduce contamination levels of the at least a portion of the contaminated emulsion;

an ultra-violet light remediation unit connected to receive the at least a portion of the contaminated emulsion from the microwave separation technology unit and having a storage capacity for storing the at least a portion of the contaminated emulsion, wherein the ultra-violet light remediation unit is adapted to further reduce the contamination levels of the at least a portion of the contaminated emulsion to produce remediated water;

another pumping unit connected between the microwave separation technology unit and the ultra-violet light remediation unit for pumping the at least a portion of the contaminated emulsion; and a second collection unit connected to the ultra-violet light remediation unit and adapted to store the remediated water.

3. The system according to claim 2 including a thermal unit connected for at least one of heating and cooling the at least a portion of the contaminated emulsion being pumped from the first collection unit to the microwave separation technology unit.

4. The system according to claim 3 wherein the thermal unit includes a heat exchanger for maintaining the at least a portion of the contaminated emulsion at a temperature of at least 85 degrees Celsius.

5. The system according to claim 2 wherein the microwave separation technology unit emits microwaves in a power range of 20 to 60 kW.

6. The system according to claim 2 wherein the ultra-violet light remediation unit emits light in a wavelength range of 90 to 400 nm.

7. The system according to claim 2 including a chemical additive unit connected to expose the at least a portion of the contaminated emulsion to at least one chemical to further reduce contamination levels of the at least a portion of the contaminated emulsion.

8. The system according to claim 2 wherein the second collection unit is a mobile container of a tanker trailer.

9. The system according to claim 2 wherein the microwave separation technology unit and the ultra-violet light remediation unit cooperate to produce the remediated water with contamination levels in a range of 0% to 5% of the contamination levels of the contaminated emulsion stored in the first collection unit.

10. A microwave-enhanced treatment system for remediation of an emulsion containing water and contaminates, comprising:

a first collection unit storing the contaminated emulsion;
a first pumping unit connected for pumping the contaminated emulsion from the first collection unit;
a microwave separation technology unit connected to receive the contaminated emulsion from the pumping unit and having a storage capacity for storing the at least a portion of the contaminated emulsion, wherein the microwave separation technology unit is adapted to reduce contamination levels of the contaminated emulsion;
a second pumping unit connected for pumping the contaminated emulsion from the microwave separation technology unit;
an ultra-violet light remediation unit connected to receive the contaminated emulsion from the second pumping unit and having a storage capacity for storing the at least a portion of the contaminated emulsion, wherein the ultra-violet light remediation unit is adapted to further reduce the contamination levels of the contaminated emulsion to produce remediated water; and
a second collection unit connected to the ultra-violet light remediation unit to receive and store the remediated water.

11. The system according to claim 10 including a thermal unit connected for at least one of heating and cooling the contaminated emulsion being pumped from the first collection unit to the microwave separation technology unit.

12. The system according to claim 11 wherein the thermal unit includes a heat exchanger for maintaining the contaminated emulsion at a temperature of at least 85 degrees Celsius.

13. The system according to claim 11 wherein the thermal unit at least one of:
heats the contaminated emulsion to a temperature of at least 85 degrees Celsius;
heats the contaminated emulsion to a temperature above an ambient temperature of the microwave separation technology unit, but less than 85 degrees Celsius; and
cools the contaminated emulsion below the ambient temperature of the microwave separation technology unit.

14. The system according to claim 10 wherein the microwave separation technology unit emits microwaves in a power range of 20 to 60 kW.

15. The system according to claim 10 wherein the ultra-violet light remediation unit emits light in a wavelength range of 90 to 400 nm.

16. The system according to claim 10 including a chemical additive unit connected to expose the contaminated emulsion to at least one chemical to further reduce contamination levels of the contaminated emulsion.

17. The system according to claim 10 wherein the second collection unit is a mobile container of a tanker trailer.

18. The system according to claim 10 wherein the microwave separation technology unit and the ultra-violet light remediation unit cooperate to produce the remediated water with contamination levels in a range of 0% to 5% of the contamination levels of the contaminated emulsion stored in the first collection unit.

19. The system according to claim 10 wherein the contaminated emulsion is contaminated Frac water.

* * * * *